E. GUNDLACH.
MICROSCOPES.
No. 182,919.    Patented Oct. 3, 1876.
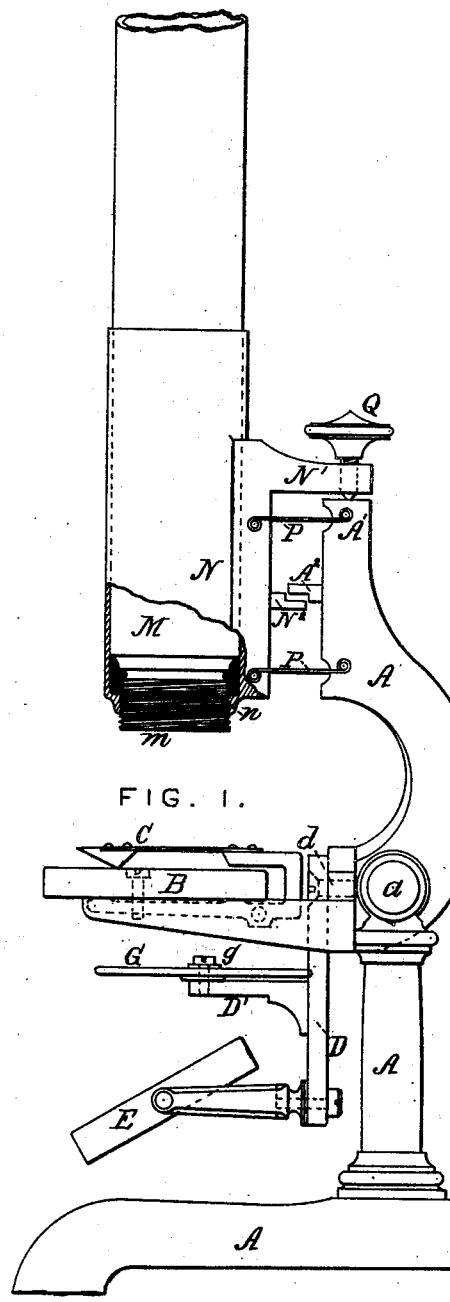
FIG. 1.
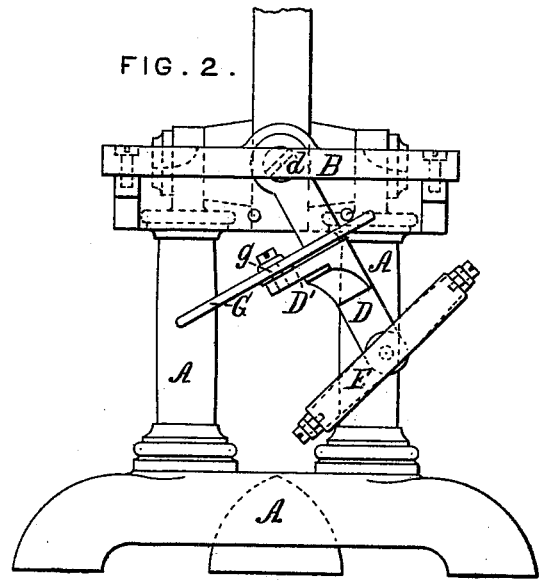
FIG. 2.
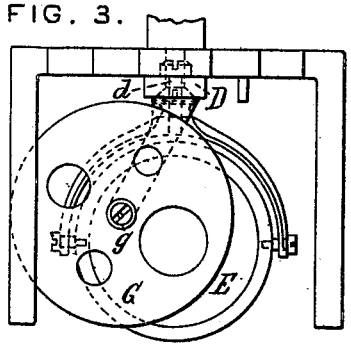
FIG. 3.
FIG. 4.
WITNESSES:
INVENTOR.

UNITED STATES PATENT OFFICE.

ERNST GUNDLACH, OF ROCHESTER, NEW YORK.

IMPROVEMENT IN MICROSCOPES.

Specification forming part of Letters Patent No. 182,919, dated October 3, 1876; application filed August 10, 1876.

*To all whom it may concern:*

Be it known that I, ERNST GUNDLACH, of Rochester, Monroe county, New York, have invented certain new and useful Improvements relating to Microscopes, of which the following is a specification:

The object of the invention is to provide simpler and more efficient means for adjusting the distance between the object and the objective, so as to bring the former into the exact focus of the latter, and also for varying and regulating the illumination of the object.

I make the body of the microscope to slide in a long collar in the usual manner. Where friction alone is employed to maintain the position of the body several serious difficulties are apt to arise. Thus, when the instrument has become worn by use, and is used in a vertical position, the body is liable to slide down through the collar by its own weight, to the great danger of injuring or destroying either the object or the objective. The same difficulty is liable to occur from any considerable pressure by an inexperienced operator when the instrument is new and in good order.

To prevent such accidents, and also to furnish a means of adjusting the focus which shall be more rapid than what is known as the fine motion, and more delicate than the usual coarse motion, I cut an external screw-thread on the lower end of the body, and match it in a corresponding internal screw-thread on the adjacent part of the collar. This allows the position of the body to be accurately adjusted by turning around, whereby it is screwed either up or down, as the case may require, and effectually prevents the body sliding of itself.

Such will serve for objectives of a long focal distance—say, two inches or more focus; but the delicacy of such adjustment is not equal to the wants of the microscopist where very high powers are used. I therefore provide an additional fine adjustment, as follows: The collar, through which the body slides, is attached to an arm which supports the stage, by means of two parallel flat springs, which increase the force with which the collar, and with it the body, tends to descend toward the stage. To raise or lower these parts, I make use of a fine micrometer-screw, and, by means of these two opposing agencies, the most delicate adjustment can be effected. Efficient stops are provided to avoid the possibility of too greatly straining the springs. This form of fine movement is exceedingly delicate, and does not cause any sensible displacement of the image.

In all microscopes hitherto constructed the fine movement consists either in the movement of one tube inside another, or of a prism inside of a hollow prism. However exactly such sliding parts may have been finished, they do not move with sufficient ease to counteract or reduce sufficiently the bad effects of friction, the cause of the so-called lost motion, and not with sufficient firmness to obviate lateral motion, which causes horizontal displacement of the image. Besides, the friction of the sliding motion interferes greatly with the easy and uniform motion of the micrometer-screw, whereby, when a strong magnifying power is used, it is rendered difficult to attain the correct position. All these faults are totally obviated by my new movement.

All the better class of microscopes are furnished with a diaphragm having apertures of several different sizes, which diaphragm is placed between the mirror and the object, so that by turning it and presenting different apertures the quantity of light may be regulated, and also the breadth of the pencil of rays from the mirror (or, as it may be termed, the angle at which the rays converge on the object) may be varied.

The planes in which diaphragms are placed have always heretofore been parallel to the slide carrying the object. I find, by experiment, that much better effects are produced by attaching the diaphragm to the mirror-bar, so that the diaphragm is always kept in a plane parallel to the mirror, no matter how much the latter may be swung out of its ordinary position for the purpose of securing oblique light.

The accompanying drawings form a part of this specification, and represent what I consider the best means of carrying out the invention.

Figure 1 is a side elevation, partly in section. It represents all the lower and middle portion of my microscope, with the mirror-frame placed perpendicular, and consequently with the diaphragm in a horizontal plane, as usual. Fig. 2 is an elevation at right angles to Fig. 1, showing my instrument with the mirror-frame, and consequently the diaphragm, mounted thereon, held in a greatly-inclined position. Fig. 3 is a plan view of a portion with the parts in the positions shown in Fig. 1. Fig. 4 is a plan view of the parts at a higher level than shown in Fig. 3.

Similar letters of reference indicate like parts in all the figures.

A is the general supporting frame-work; B, the stage; and C, clamps which serve to hold the object. (Not represented.) D is the frame which carries the mirror E, and is capable of adjustment by turning on the pivot-screw $d$. An arm, D′, carried on the frame D, either adjustably or otherwise, supports the diaphragm G, allowing it to be turned on the central pivot-screw $g$, and to serve in all respects in the ordinary manner, except that, inasmuch as the arm D′ is carried on the frame D, the diaphragm partakes necessarily of all the motions thereof. When the frame D is upright the diaphragm is horizontal, as usual. When, in order to move the mirror to one side, the frame D is inclined, the diaphragm G has a corresponding inclination.

It will be understood that the framing A may turn on the axis $a$ in the ordinary manner, to change its inclination at will.

M is the body formed near the base with a male screw-thread, $m$. N is the collar formed at the base with a female screw-thread, $n$. P P are flat springs, two in number, formed as shown, and engaged in the collar N and the body A, with their ends fitting tightly in corresponding cavities. I prefer to form these cavities by drilling holes and sawing narrow saw-kerfs communicating therewith. The ends of the springs being formed into corresponding bends, the springs are forced edgewise tightly into the cavities, and are thereby fitted very firmly. Q is a micrometer-screw, tapped through the arm N′, which extends from the collar N across the upper end A′ of the frame A. $N^2 A^2$ are stops mounted firmly on the respective parts N A. The screw Q acts on the upper end A′ of the framing, and as it is turned in one direction lowers the collar N and its connections in obedience to gravity, aided by the force of the springs P, and as it is turned in the other direction raises all these parts in opposition to such force. The springs P perform the double function of very firm and efficient guides to the collar N and its connections, and also by their considerable force taking up all slack or lost motion, and holding the parts firmly to their bearings. If the inexperienced or very absorbed operator shall attempt to lower the parts too low the further lowering will be prevented by the contact of N′ with A′. If he shall undertake to raise the parts too high, he cannot fail to feel and be warned by the increased resistance to the turning of the screw Q when the stout stops $N^2$ and $A^2$ come firmly together. The adjustment by turning the screw Q and raising and lowering the collar N, carrying the body with it, is only for final adjustment. The previous or approximate adjustment of focus may be obtained by turning the body within the collar. Such turning will, by the action of the screw-thread $m\ n$ raise and lower the body within the collar to any desired extent, leaving the exactly correct position to be found afterward by turning the screw Q.

The advantages secured by my form of fine movement are that it causes no change in the length of the body, and consequently none in the magnifying power. It does not affect the stage. While it is extremely delicate, there is, by reason of the firm bearing induced by the springs, no lost motion possible, and no twist or side movement.

My plan of mounting the diaphragm in the mirror-frame insures that the light thrown up through an orifice in the diaphragm shall have the same form as the orifice. The latter being, preferably, circular the pencil of rays received through the same is circular, and can be depended upon as exactly proportionate to the size of the aperture, however obliquely the light may come. In the ordinary arrangement, when the diaphragm is necessarily horizontal, throwing the light obliquely makes the pencil of rays elliptical, and the quantity of light is irregularly contracted and uncertain.

One of the holes in my diaphragm may be slit open to the outer edge, so as to give a long narrow slit instead of a round hole. The object may be illuminated through such a slit in the diaphragm with light of great obliquity, and yet free from the cross rays which interfere with perfect definitions.

I claim as new in my microscope—

1. In combination with the collar N, carrying the body M, the springs P serving the double function of guides for the collar and springs to depress it and prevent lost motion, as herein specified.

2. The springs or guides P, body M, collar N, arm $N^1$, screw Q, and stops $N^2 A^2$, in combination, as herein specified.

3. The mirror-bar D, mirror E, D′, and diaphragm G, combined and arranged relatively to the stage B, as and for the purposes herein specified.

ERNST GUNDLACH.

Witnesses:
JOHN J. BAUSCH,
HENRY LUMB.